UNITED STATES PATENT OFFICE.

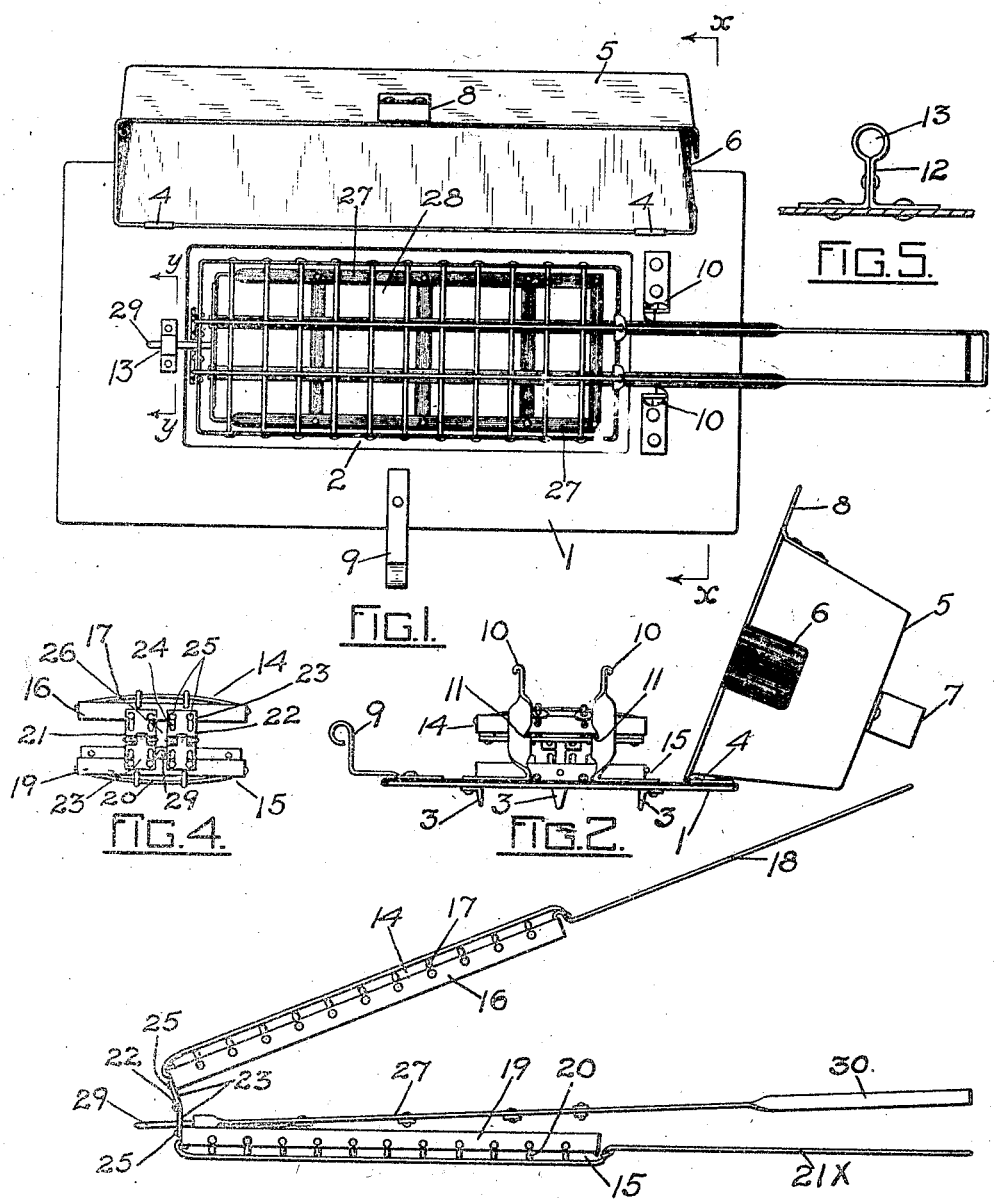

BERNARD McCAUGHEY, OF PAWTUCKET, RHODE ISLAND.

BROILER.

No. 914,159.                 Specification of Letters Patent.         Patented March 2, 1909.

Application filed August 8, 1908. Serial No. 447,545.

*To all whom it may concern:*

Be it known that I, BERNARD McCAUGHEY, a citizen of the United States, residing at Pawtucket, in the county of Providence and State of Rhode Island, have invented certain new and useful Improvements in Broilers, of which the following is a specification.

My invention relates to broilers and has for its principal objects means for uniformly subjecting a plurality of objects to be broiled to heat; means for rendering the frame readily removable from the housing; means for insuring an ample circulation around both faces of the objects to be broiled; and means for regulating the distance of the leaves of the frame from each other.

Other objects and advantages will be hereinafter set forth and claimed.

To the above ends essentially my invention consists in the novel construction and combination of parts hereinafter set forth and illustrated in the accompanying drawings, wherein, Figure 1, is a plan of my broiler with cover raised, Fig. 2, a section on line X X of Fig. 1. Fig. 3, a side elevation of the leaves and partition, plate in open position. Fig. 4, an end elevation of the leaves or frame, and Fig. 5, a section on line Y Y of Fig. 1.

Like reference characters indicate like parts throughout the views.

My device includes a flat sheet metal base or housing frame, 1, having a central rectangular aperture, 2, and adjacent thereto depending pivoted fingers or clips, 3. Mounted by hinges 4, to the rear upper face of the base is a housing cover 5, with an end aperture, 6, and a handle, 7. A lip, 8, upon this cover is adapted to be engaged by an arm, 9, pivoted to the front of the frame. Adjacent one end of the opening, 2, upon the base are two interspaced posts, 10, with shoulders, 11, upon their opposite inner margins some distance above the base. Fixed to the base near the margin of the opening opposite to the posts is a bearing comprising a vertical support, 12, with an opening, 13, in its end.

For use in the described or other convenient housing device is a broiling frame comprising upper and lower leaves 14, and 15. The former comprises a broad marginal band or frame, 15, cross bars, 17, and handle, 18. The lower leaf, 15, has corresponding parts, 19, 20, and 21, respectively. The forward ends of the leaves are pivotally connected by one or more hinge members. I prefer for this purpose two hinged members, 21ˣ, 22, interspaced from each other, and each comprising butts or hinge plates, 23, provided with vertical slots, 24, to receive loosely screws or pins, 25, in the frames 16 and 19. A resulting oblong vertical space, 26, occurs between the hinges, 21ˣ, 22; and by virtue of the slots and pins 24, 25, the leaves 14 and 15 are permitted considerable play toward and away from each other.

A removable partition member is provided. This consists of a frame or plate, 27, with perforations or interstices, 28, and provided at one end with a projection, 29, and at its other end with a handle 30. This handle is broader than the handles, 18 and 21. The partition member is located between the leaves, with its projection loosely traversing the space 26, between the hinged members, and adapted to loosely rest in the bearing 13. Its handle, 30, being broader than the handles 18 and 21, is loosely supported by the shoulders, 11, of the posts when the broiler frame parts are in horizontal position.

To operate, the steaks are placed upon both sides of the plate, 27, within the leaves, 14, 15, and the handles placed between the parts as above described. After subjecting the meat a sufficient interval to the heat through opening 2 the handles are slightly turned to permit their being elevated above the posts, 10, where they are free to be rotated to expose an opposite side to the heat. Since the hinges allow ample play of the leaves, steaks of different sizes may be inserted and ample hot air circulation and space will always exist between the steak and the lower surface of the plate, 27. The perforations or openings in the plate, 27, also expose the lower face of the upper steak to the hot air, thus equalizing the cooking.

The bent, pivoted fingers, 3, are adapted to engage the base, 1, with varied sizes of stove openings.

What I claim is,

1. In a broiler, the combination with two leaves, of means for pivotally connecting the leaves, and a plate removably mounted intermediate the leaves and contacting with the connecting means.

2. In a broiler, the combination with two leaves, of means for pivotally connecting the leaves, and a plate removably mounted intermediate the leaves and engaging the connecting means.

3. In a broiler, the combination with two leaves, of means for pivotally connecting the leaves, and a plate removably mounted intermediate the leaves and traversing the connecting means.

4. In a broiler, the combination with two leaves, of pivot members to which the leaves are connected at one end, and an independent member removably mounted intermediate the leaves and engaged by the pivot members.

5. In a broiler, the combination with a plurality of leaves pivotally connected at one end, of an independent member slidably mounted intermediate the leaves.

6. In a broiler, the combination with a plurality of leaves pivotally connected at one end, of a partition member slidably mounted intermediate the leaves.

7. In a broiler, the combination with a plurality of leaves pivotally connected at one end, of an independent plate provided with openings slidably mounted intermediate the leaves.

8. In a broiler, the combination with two leaves, of pivot members interspaced from each other to which the leaves are connected at one end, and an independent member mounted intermediate the leaves and extending between the pivot members.

9. In a broiler, the combination with two leaves, of two pivot members inclosing a vertical opening and to which the leaves are connected at one end, and an independent member mounted intermediate the leaves and traversing the opening.

10. In a broiler, the combination with two leaves, of two sets of hinges each set comprising a pintle and hinge plates provided with vertical slots, engaging members upon the adjacent ends of the leaves passing through the slots, and an independent member mounted intermediate the leaves and extending between the two sets of hinges.

11. In a broiler, the combination with the base provided with a central opening, of a housing cover upon the base extending over the opening, two leaves mounted upon the base above the opening, means for connecting the leaves at one of their respective ends, and a plate mounted intermediate the leaves and engaging the connecting means.

12. In a broiler, the combination with a base provided with a central opening, of a bearing upon the base adjacent one end of the opening, a partition plate above the opening, two interspaced leaves pivotally connected at one end inclosing the partition plate, a projection upon the partition plate extending between the leaves and loosely mounted in the bearing and a housing cover hinged to the base and extending over the leaves.

13. In a broiler the combination with a base provided with a central opening, of vertical posts adjacent one end of the opening, shoulders upon the inner margins of the posts intermediate their length, a bearing upon the base adjacent the opposite end of the opening, a partition plate above the opening, a handle upon one end of the partition plate resting upon the shoulders, two interspaced leaves pivotally connected at one end inclosing the partition plate, handles upon the leaves adapted to pass loosely between the posts, a projection upon the partition plate extending between the leaves and loosely resting in the bearing, and a housing cover hinged to the base and extending over the leaves.

14. In a broiler, the combination with two leaves, of two sets of hinges interspaced from each other to form an intermediate oblong opening and connecting the leaves, and an independent member mounted intermediate the leaves and extending through the oblong opening.

In testimony whereof I have affixed my signature in presence of two witnesses.

BERNARD McCAUGHEY

Witnesses:
 LEONARD W. HORTON,
 HORATIO E. BELLOWS.